US009849913B2

(12) United States Patent
Sugano (10) Patent No.: US 9,849,913 B2
(45) Date of Patent: Dec. 26, 2017

(54) VEHICLE FRONT SECTION STRUCTURE

(71) Applicant: TOYOTA JIDOSHA KABUSHIKI KAISHA, Toyota-shi (JP)

(72) Inventor: Chitoshi Sugano, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/207,607

(22) Filed: Jul. 12, 2016

(65) Prior Publication Data
US 2017/0073011 A1    Mar. 16, 2017

(30) Foreign Application Priority Data

Sep. 16, 2015    (JP) .................................. 2015-183288

(51) Int. Cl.
*B62D 21/15*    (2006.01)
*B62D 25/08*    (2006.01)

(52) U.S. Cl.
CPC ........... *B62D 21/152* (2013.01); *B62D 25/08* (2013.01); *B62D 25/082* (2013.01)

(58) Field of Classification Search
CPC .... B62D 21/15; B62D 21/152; B62D 21/155; B62D 25/08; B62D 25/082
USPC ....................................... 296/187.09, 203.02
See application file for complete search history.

(56) References Cited

U.S. PATENT DOCUMENTS

| 3,794,348 | A  | * | 2/1974  | Fischer  | B62D 21/152 188/371 |
| 8,201,872 | B2 | * | 6/2012  | Baccouche | B62D 21/152 296/187.09 |
| 2005/0189788 | A1 | * | 9/2005  | Cornell | B62D 21/155 296/187.09 |
| 2011/0002040 | A1 |   | 1/2011  | Aoki | |
| 2011/0272971 | A1 | * | 11/2011 | Kihara | B62D 25/2018 296/203.02 |
| 2013/0320710 | A1 |   | 12/2013 | Watanabe | |
| 2016/0347374 | A1 | * | 12/2016 | Miyamoto | B62D 21/152 |
| 2016/0362129 | A1 | * | 12/2016 | Taki | B62D 5/0409 |
| 2016/0368536 | A1 | * | 12/2016 | Cazes | C21D 9/0068 |

(Continued)

FOREIGN PATENT DOCUMENTS

| JP | 2011-13630    | 1/2011 |
| JP | 2013-248898   | 12/2013 |

(Continued)

*Primary Examiner* — Gregory Blankenship
(74) *Attorney, Agent, or Firm* — Oblon, McClelland, Maier & Neustadt, L.L.P.

(57) ABSTRACT

A vehicle front section structure including: a front side member that includes an inside sidewall portion; a first wall portion that configures part of a power unit support section, and that is joined to the inside sidewall portion by a first join portion; a second wall portion that configures part of the power unit support section, and that is joined to the inside sidewall portion by a second join portion; and a low rigidity portion of the inside sidewall portion that is disposed at another side in a vehicle front-rear direction, and the vehicle lower side, of the first join portion, that is disposed further toward one side in the vehicle front-rear direction than the second join portion, and that has lower rigidity than a portion of the inside sidewall portion further toward the one side in the vehicle front-rear direction than the first join portion.

3 Claims, 8 Drawing Sheets

(56) References Cited

U.S. PATENT DOCUMENTS

2017/0073011 A1\* 3/2017 Sugano .................. B62D 21/02
2017/0073013 A1\* 3/2017 Sasaki .................. B62D 21/152

FOREIGN PATENT DOCUMENTS

| JP | 2015-9740 | 1/2015 |
| JP | 2015-13630 | 1/2015 |

\* cited by examiner

VEHICLE FRONT SECTION STRUCTURE

CROSS-REFERENCE TO RELATED APPLICATION

This application is based on and claims priority under 35 USC 119 from Japanese Patent Application No. 2015-183288 filed on Sep. 16, 2015, the disclosure of which is incorporated by reference herein.

BACKGROUND

Technical Field

The present invention relates to a vehicle front section structure.

Related Art

Japanese Patent Application Laid-Open (JP-A) No. 2015-13630 describes an invention related to an apron side member reinforcement structure. In this apron side member reinforcement structure, a bead section extending in a vehicle front-rear direction is formed at a side wall portion at a vehicle width direction inner side of an apron side member (front side member) to increase the rigidity of the apron side member. An engine mount bracket is provided to an upper side wall of the apron side member, and an engine (power unit) is supported by the upper side wall of the engine mount bracket. A position of a flange at the vehicle front side of the engine bracket mount at the vehicle front side and a position of a rear end portion of the bead section, described above, are aligned with each other in the vehicle front-rear direction. When collision load is input from the vehicle front side, deformation of the apron side member originating at a region connecting the bead section and the engine mount bracket together can be encouraged, and deformation of the apron side member in the vehicle width direction can be suppressed. As a result, when collision load is input from the vehicle front side, the apron side member can efficiently absorb collision load from the vehicle front side.

However, in the case of the related art described in JP-A No. 2015-13630, the region at which the apron side member deformation originates is only locally reinforced by the bead section in cross-section, as viewed along the vehicle front-rear direction. It is therefore conceivable that the axial line of deformation of the apron side member when undergoing folding deformation is slanted with respect to the vehicle vertical direction, such that there is room for improvement in the point of stabilizing and securing the deformation stroke of the apron side member. Moreover, according to the vehicle model, sometimes it is preferable to configure the origin point of deformation of the apron side member to be set at an upper side wall portion of the engine mount bracket in vehicle side view, namely, at a lower side of a wall portion supporting the engine. However, in the above related art, it is difficult to accommodate such a configuration.

SUMMARY

In consideration to the above circumstances, an object of the present invention is to provide a vehicle front section structure that is capable of stabilizing and securing a deformation stroke of a front side member, and that is capable of setting an origin point of deformation of the front side member at a lower side of a wall portion supporting a power unit in vehicle side view when collision load is input from the vehicle front side.

A vehicle front section structure of a first aspect of the present invention includes: a front side member that extends in a vehicle front-rear direction, that includes an inside sidewall portion disposed at a vehicle width direction inner side, and that is configured by a closed cross-section structure forming a closed cross-section profile as viewed in the vehicle front-rear direction; a first wall portion that configures a first part of a power unit support section attaching a power unit to the front side member, that is disposed furthest toward one side in the vehicle front-rear direction among plural of wall portions disposed facing the vehicle front-rear direction, and that has a peripheral edge portion at a vehicle width direction outer side joined to the inside sidewall portion by a first join portion; a second wall portion that configures a second part of the power unit support section, that is disposed adjacent to the first wall portion in the vehicle front-rear direction, that has an end portion at a vehicle lower side disposed further toward the vehicle lower side than an end portion at the vehicle lower side of the first wall portion, and that has a peripheral edge portion at the vehicle width direction outer side joined to the inside sidewall portion by a second join portion; and a low rigidity portion of the inside sidewall portion that is disposed at another side in the vehicle front-rear direction, and the vehicle lower side, of the first join portion, that is disposed further toward the one side in the vehicle front-rear direction than the second join portion, that has a lower rigidity than a portion of the inside sidewall portion further toward the one side in the vehicle front-rear direction than the first join portion, and that extends in the vehicle vertical direction.

According to the vehicle front section structure of the first aspect of the present invention, the front side member extends in the vehicle front-rear direction, and the front side member is configured by a closed cross-section structure forming a closed cross-section profile, as viewed along the vehicle front-rear direction. The front side member thereby undergoes crushing deformation along its length direction and absorbs collision load when collision load is input from a vehicle front side.

The power unit is attached to the front side member through the power unit support section, and the power unit support section is configured including an upper side wall portion supporting the power unit and plural wall portions disposed facing in the vehicle front-rear direction. The peripheral edge portion at the vehicle width direction outside of the first wall portion disposed furthest toward the one side in the vehicle front-rear direction among the plural wall portions, is joined by the first join portion to the inside sidewall portion disposed at the vehicle width direction inner side configuring part of the front side member. The portion at the vehicle width direction outside end of the second wall portion, disposed adjacent to the first wall portion in the vehicle front-rear direction, is joined to the inside sidewall portion of the front side member by the second join portion. The power unit support section thereby functions as a reinforcement member of the front side member, and the rigidity of the front side member at the portion provided with the power unit support section is thereby improved. As a result, the front side member undergoes folding deformation originating at the vicinity of the first join portion when collision load is input from the vehicle front side.

Note that to efficiently absorb collision load from the vehicle front side through crushing deformation of the front side member, it is effective to stabilize and secure the deformation stroke of the front side member. In order to stabilize and secure the deformation stroke of the front side member, it is preferable for the axial line of deformation of the front side member to lie along the vehicle vertical direction when the front side member undergoes folding deformation. Moreover, depending on the vehicle model, sometimes it is preferable for configuration to be made in which the origin point of deformation of the front side member is set at the lower side of the upper side wall portion of the power unit support section in vehicle side view.

Note that in the present aspect, the end portion at the vehicle lower side of the second wall portion is disposed further toward the vehicle lower side than the end portion at the vehicle lower side of the first wall portion. Thus, a portion on the inside sidewall portion of the front side member at the periphery of the second join portion is reinforced by the second wall portion, and rigidity is increased.

The low rigidity portion of the inside sidewall portion of the front side member is disposed further toward the one side in the vehicle front-rear direction than the second join portion. The low rigidity portion is disposed at the another side in the vehicle front-rear direction and the vehicle lower side of the first join portion. The rigidity of the low rigidity portion of the front side member is set lower than that of the portion on the inside sidewall portion further toward the one side in the vehicle front-rear direction than the first join portion, and the low rigidity portion extends in the vehicle vertical direction. Thus, when collision load is input from the vehicle front side, the front side member undergoes deformation originating at the low rigidity portion, and the axial line of deformation of the front side member lies along the vehicle vertical direction when the front side member undergoes folding deformation. Moreover, the low rigidity portion is in a state disposed at the lower side of the upper side wall portion of the power unit support section in vehicle side view. The origin point of deformation of the front side member is thereby set at the lower side of the upper side wall portion of the power unit support section in vehicle side view.

A vehicle front section structure of a second aspect of the present invention is the vehicle front section structure of the first aspect, further including a bead section that is integrally formed at the inside sidewall portion and that bulges toward the vehicle width direction inner side. An end portion at the another side in the vehicle front-rear direction of the bead section extends along the vehicle vertical direction and is disposed at the another side in the vehicle front-rear direction, and the vehicle lower side, of the first join portion. Wherein the low rigidity portion is provided at a portion of the inside sidewall portion between the second join portion and the end portion at the another side in the vehicle front-rear direction of the bead section.

According to the vehicle front section structure of the second aspect of the present invention, the bead section is integrally formed at the inside sidewall portion of the front side member and bulges toward the vehicle width direction inner side. The end portion at the another side in the vehicle front-rear direction of the bead section is disposed at the another side in the vehicle front-rear direction and the vehicle lower side of the first join portion. Thus, a high rigidity portion is configured on the inside sidewall portion of the front side member within a range where the bead section is formed, from the end portion at the another side in the vehicle front-rear direction of the bead section to the one side in the vehicle front-rear direction.

The end portion at the another side in the vehicle front-rear direction of the bead section extends along the vehicle vertical direction. The low rigidity portion, extending along the vehicle vertical direction and having relatively lower rigidity than the high rigidity portion configured including the bead section, is accordingly configured on the inside sidewall portion of the front side member at a portion between the second join portion and the end portion at the another side in the vehicle front-rear direction of the bead section. Accordingly, in the present invention, the high rigidity portion can be set to the front side member without providing a separate member, and the low rigidity portion that becomes the origin point of folding deformation when the front side member undergoes folding deformation can be set without lowering the rigidity of the front side member.

A vehicle front section structure of a third aspect of the present invention is the vehicle front section structure of the second aspect, wherein an end portion at the one side in the vehicle front-rear direction of the bead section is disposed at a specific interval further toward the one side in the vehicle front-rear direction than the first join portion.

In the vehicle front section structure of the third aspect of the present invention, the end portion at the one side in the vehicle front-rear direction of the bead section is disposed at a specific interval further to the one side in the vehicle front-rear direction than the first join portion, and a high rigidity portion is configured on the inside sidewall portion of the front side member by the bead section in a range extending further to the one side in the vehicle front-rear direction than the first join portion.

Note that the front side member is reinforced not only by the bead section, but also by the power unit support section. Thus, in a case in which the end portion at the one side in the vehicle front-rear direction of the bead section is disposed in the vicinity of the first join portion in the vehicle front-rear direction, the rigidity would change greatly between the one side in the vehicle front-rear direction and the another side in the vehicle front-rear direction of the first join portion. As a result, when collision load is input from the vehicle front side, it is conceivable that the first join portion would become the origin point of folding deformation of the front side member, and the degree of certainty would decrease of the origin point of deformation being at the lower side of the upper side wall portion of the power unit support section in vehicle side view.

Thus in the present aspect, the inside sidewall portion of the front side member is reinforced by the bead section in a range extending further to the one side in the vehicle front-rear direction than the first join portion, such that the rigidity of the front side member can be suppressed from changing greatly in the vicinity of the first join portion.

A vehicle front section structure of a fourth aspect of the present invention is the vehicle front section structure of the third aspect, wherein the bead section includes one side wall portion configuring the one side in the vehicle front-rear direction of the bead section, and another side wall portion configuring the another side in the vehicle front-rear direction of the bead section. In cross-section, as viewed in the vehicle vertical direction, the one side wall portion is inclined from the end portion at the one side in the vehicle front-rear direction of the bead section toward the another side in the vehicle front-rear direction and toward the vehicle width direction inner side, the another side wall portion is inclined from the end portion at the another side in the vehicle front-rear direction of the bead section toward the one side in the vehicle front-rear direction and toward the vehicle width direction inner side, and a gradient of the another side wall portion is larger than a gradient of the one side wall portion.

In the vehicle front section structure of the fourth aspect of the present invention, the bead section formed on the inside sidewall portion of the front side member includes the one side wall portion configuring the one side in the vehicle front-rear direction of the bead section, and the another side wall portion configuring the another side in the vehicle front-rear direction of the bead section. The one side wall portion is inclined from the end portion at the one side in the vehicle front-rear direction of the bead section toward the another side in the vehicle front-rear direction and toward the vehicle width direction inner side in cross-section, as viewed along the vehicle vertical direction. In contrast, the another side wall portion is inclined from the end portion at the another side in the vehicle front-rear direction of the bead section toward the one side in the vehicle front-rear direction and the vehicle width direction inner side in cross-section, as viewed along the vehicle vertical direction, and the gradient of the another side wall portion is larger than the gradient of the one side wall portion.

Thus, taking the end portion at the another side in the vehicle front-rear direction of the bead section as a reference, the rigidity of the portion of the inside sidewall portion of the front side member where the bead section is provided gradually increases from this end portion toward a boundary portion between the one side wall portion and the another side wall portion. The rigidity of the portion of the inside sidewall portion of the front side member from the boundary portion between the one side wall portion and the another side wall portion of the bead section to the one side in the vehicle front-rear direction end portion of the bead section accordingly gradually lowers from the boundary portion toward this end portion. The amount of change in rigidity per unit length in the vehicle front-rear direction of the portion of the inside sidewall portion where the bead section is provided is greater at the another side wall portion side than at the one side wall portion side. As a result, when collision load is input from the vehicle front side, stress more readily concentrates at the location of the inside sidewall portion where the end portion at the another side in the vehicle front-rear direction of the bead section is disposed. In contrast, when collision load is input from the vehicle front side, stress is suppressed from concentrating at the location of the inside sidewall portion of the front side member where the end portion at the one side in the vehicle front-rear direction of the bead section is disposed, compared to the location where the end portion at the another side in the vehicle front-rear direction of the bead section is disposed.

A vehicle front section structure of a fifth aspect of the present invention is the vehicle front section structure of the first aspect, wherein the low rigidity portion is configured by a pierced portion that is formed piercing through the inside sidewall portion in the vehicle width direction and that extends in the vehicle vertical direction.

According to the vehicle front section structure of the fifth aspect of the present invention, the pierced portion is formed piercing through the inside sidewall portion of the front side member in the vehicle width direction and the low rigidity portion is configured by the pierced portion. The low rigidity portion can thereby be set at any position within a specific range of the inside sidewall portion of the front side member, and the rigidity of the portion of the inside sidewall portion that is configured by the low rigidity portion can be adjusted by adjusting the length and width of the pierced portion.

As explained above, the vehicle front section structure of the first aspect of the present invention has the excellent advantageous effect of being capable of stabilizing and securing the deformation stroke of the front side member, and being capable of setting the origin point of deformation of the front side member at the lower side of the power unit support section in vehicle side view when collision load is input from the vehicle front side.

The vehicle front section structure of the second aspect of the present invention has the excellent advantageous effect of being capable of stabilizing and securing the deformation stroke of the front side member while achieving both suppression of increased load on the front side member and maintenance of the rigidity of the front side member.

The vehicle front section structure of the third aspect of the present invention has the excellent advantageous effect of being capable of increasing the degree of certainty that the origin point of folding deformation of the front side member is at the lower side of the upper side wall portion of the power unit support section in vehicle side view when collision load is input from the vehicle front side.

The vehicle front section structure of the fourth aspect of the present invention has the excellent advantageous effect of increasing the degree of certainty that the front side member undergoes deformation originating at the low rigidity portion when collision load is input from the vehicle front side.

The vehicle front section structure of the fifth aspect of the present invention has the excellent advantageous effect of being capable of setting the origin point of folding deformation in the front side member when collision load is input from the vehicle front side by performing simple processing on the front side member.

BRIEF DESCRIPTION OF THE DRAWINGS

Exemplary embodiments of the present invention will be described in detail based on the following figures, wherein.

DETAILED DESCRIPTION

First Exemplary Embodiment

Explanation follows regarding a vehicle front section structure according to a first exemplary embodiment of the present invention, with reference to FIG. 1 to FIG. 7C. Note that in each of the drawings, the arrow FR indicates the vehicle front side, the arrow UP indicates the vehicle upper side, and the arrow OUT indicates the vehicle width direction outside, as appropriate.

Figure 4:
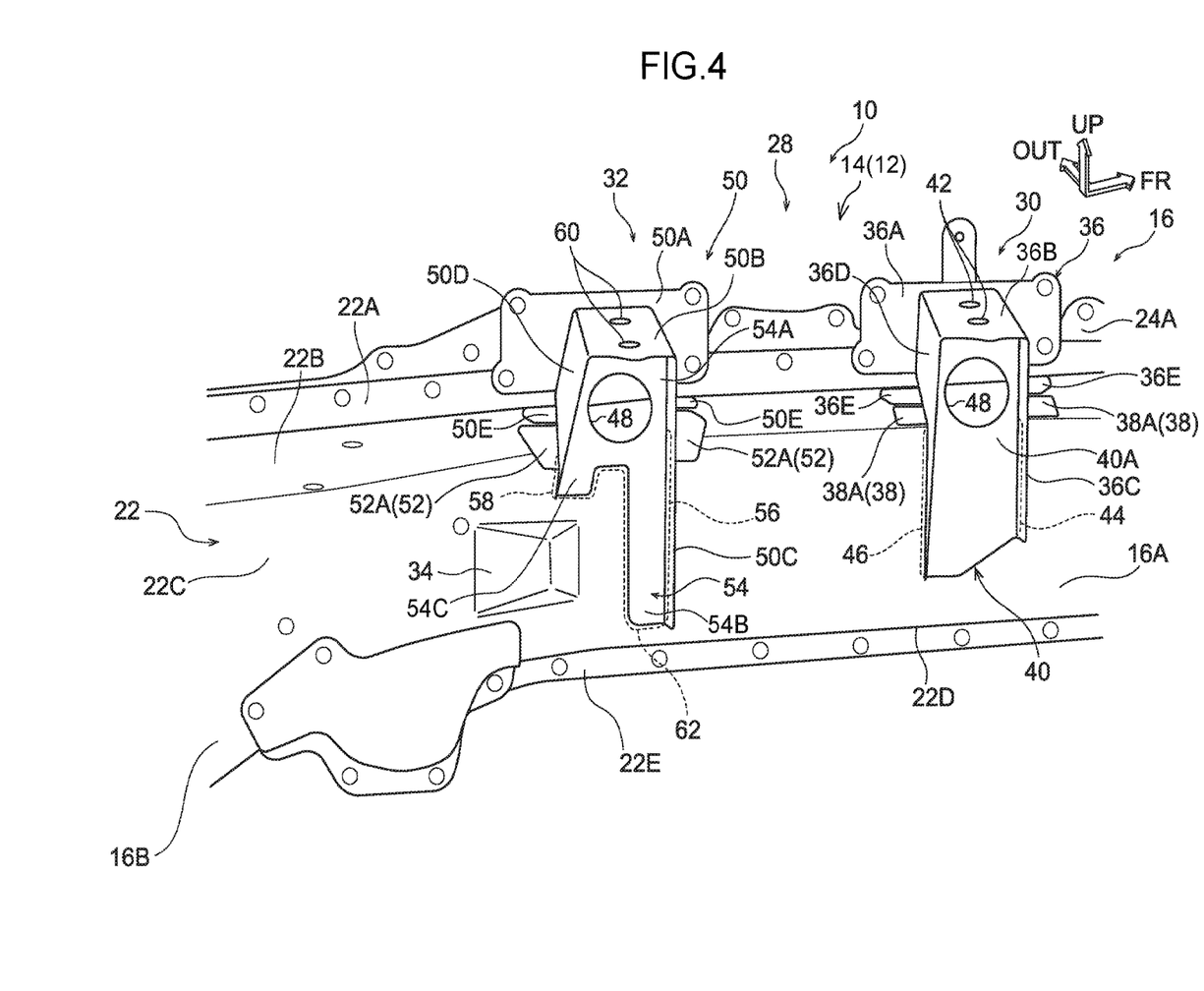
FIG. 4 is a perspective view of a vehicle front section applied with a vehicle front section structure according to the first exemplary embodiment, as viewed obliquely from the vehicle inside rear.
Figure 5:
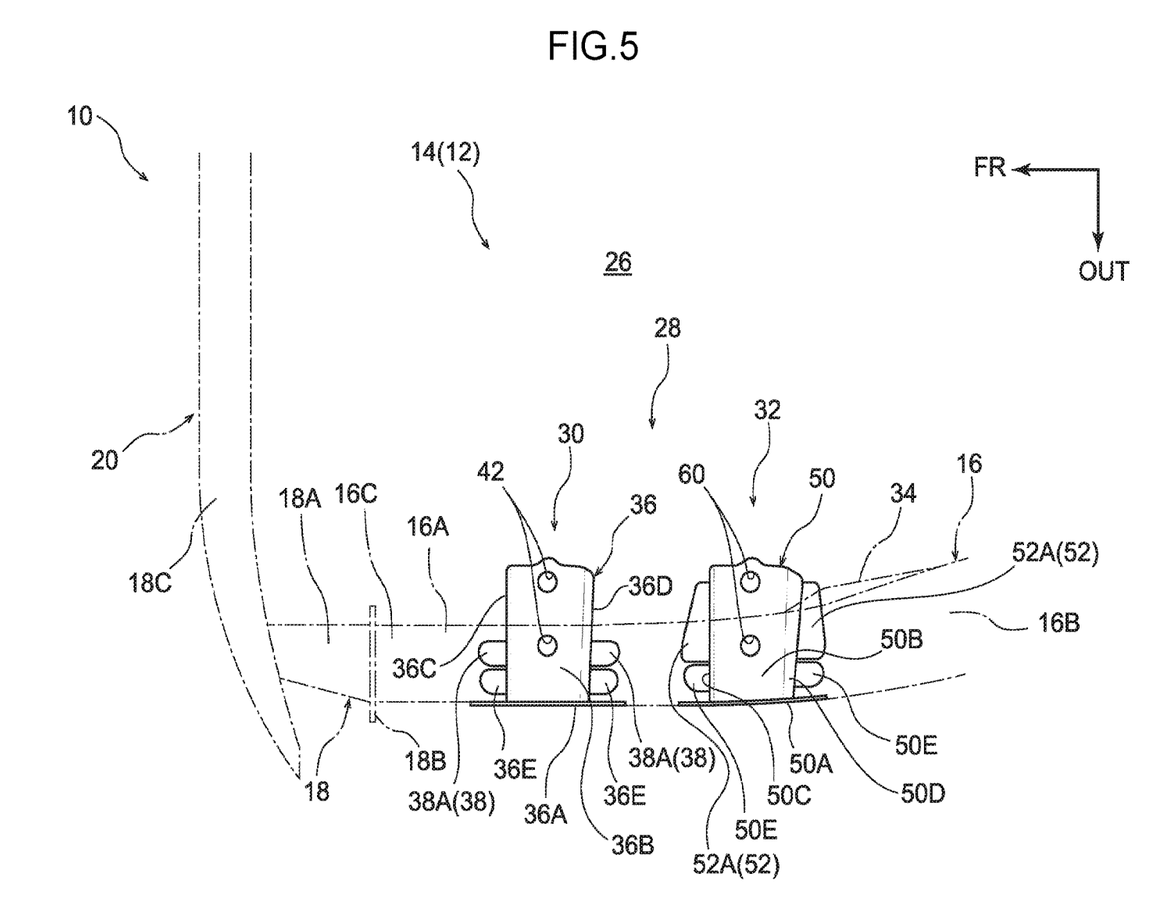
FIG. 5 is a plan view of a vehicle front section applied with a vehicle front section structure of the first exemplary embodiment, as viewed from the vehicle upper side.

First, explanation follows regarding an overall configuration of a vehicle body front section 14 that configures part of a vehicle body 12 of a vehicle 10 applied with a vehicle front section structure according to the first exemplary embodiment of the present invention, with reference to FIG. 4 and FIG. 5. Note that in the present exemplary embodiment, since the vehicle body front section 14 is basically configured with left-right symmetry, explanation follows focusing on the configuration of part of the vehicle body front section 14 on a vehicle width direction left side.

The vehicle body front section 14 is configured including a pair of left and right front side members 16 configuring framework of the vehicle body 12, crash boxes 18 that are attached to the front side members 16, and bumper reinforcement 20 spanning between the crash boxes 18.

Figure 2:
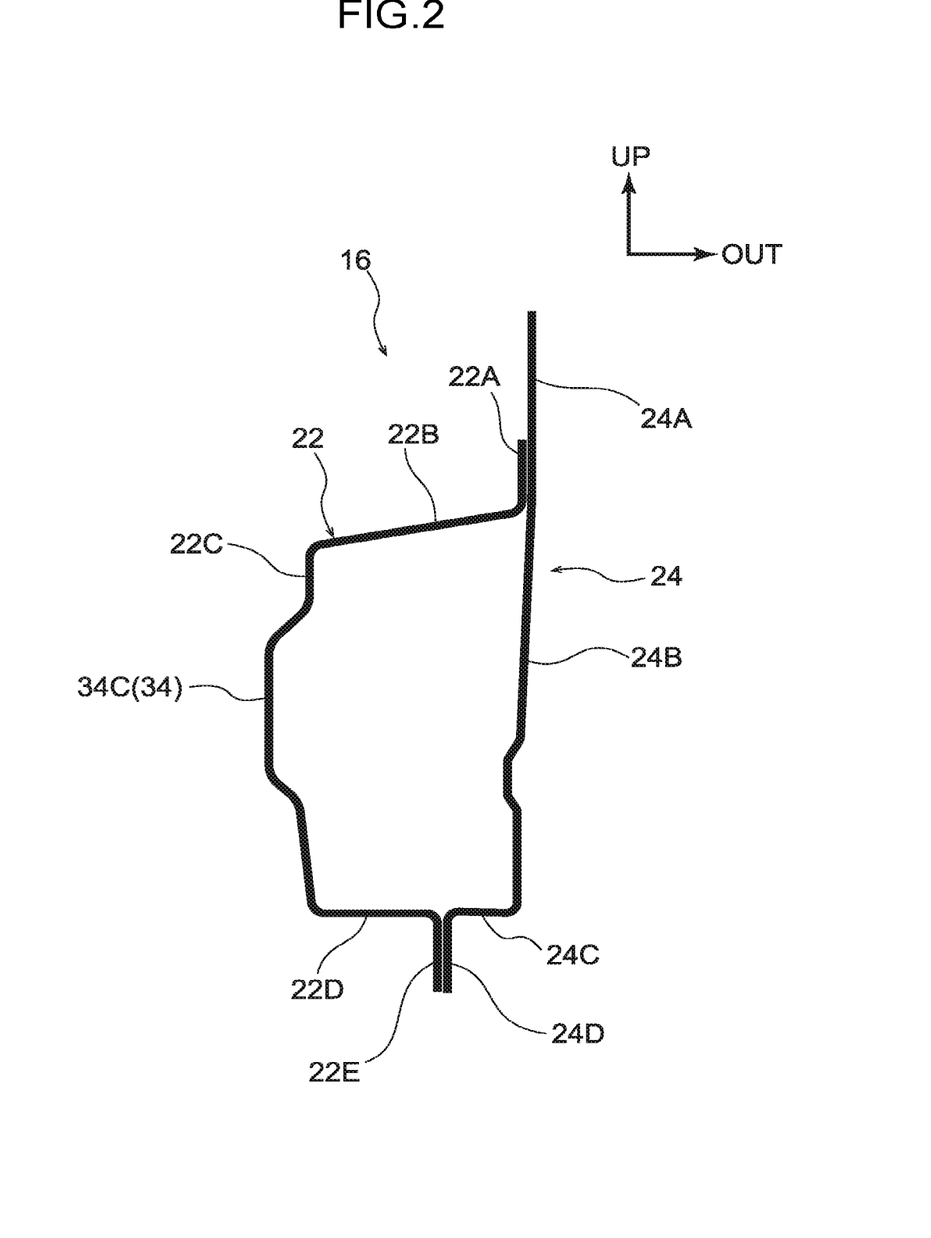
FIG. 2 is a cross-section (a cross-section illustrating a state sectioned along line 2-2 in FIG. 1) illustrating configuration of a front side member configuring a vehicle front section applied with a vehicle front section structure according to the first exemplary embodiment, as viewed from a vehicle front side.

As illustrated in FIG. 2, the front side member 16 extends overall in a vehicle front-rear direction, and is configured by a closed cross-section structure forming a rectangular frame shaped closed cross-section, as viewed along the vehicle front-rear direction. The front side member 16 is configured including a front section 16A that configures a portion of the front side member 16 at the vehicle front side extending in a straight line in the vehicle front-rear direction, and a kick section 16B that is formed at the vehicle rear side of the front section 16A and is angled from a vehicle front upper side toward a vehicle rear lower side.

The front side member 16 is configured including a front side inner member 22 configuring a portion of the front side member 16 at the vehicle width direction inner side, and front side outer member 24 configuring a portion of the front side member 16 at the vehicle width direction outside. The front side inner member 22 includes an upper side flange 22A, an upper wall portion 22B, an inside sidewall portion 22C, a lower wall portion 22D, and a lower side flange 22E. The front side inner member 22 is configured in substantially a hat shape that is open to the vehicle width direction outside in cross-section, as viewed along the vehicle front-rear direction.

More specifically, the upper side flange 22A is disposed with its plate thickness direction in the vehicle width direction, has uniform width in the vehicle vertical direction, and is configured by a plate shape extending in the vehicle front-rear direction. The upper wall portion 22B, which has its plate thickness direction in the vehicle vertical direction, extends out toward the vehicle width direction inner side from a peripheral edge portion at the vehicle lower side of the upper side flange 22A. The inside sidewall portion 22C, which has its plate thickness direction in the vehicle width direction, and which is disposed at the vehicle width direction innermost side out of the wall portions configuring the front side inner member 22, extends out toward the vehicle lower side from a peripheral edge portion at the vehicle width direction inner side of the upper wall portion 22B. The lower wall portion 22D, which has its plate thickness direction in the vehicle vertical direction, extends out toward the vehicle width direction outside from a peripheral edge portion at the vehicle lower side of the inside sidewall portion 22C. The lower side flange 22E, which has its plate thickness direction in the vehicle width direction, and which is configured by a plate shape that has uniform width in the vehicle vertical direction and extends in the vehicle front-rear direction, extends out toward a vehicle lower side from a peripheral edge portion at the vehicle width direction outside of the lower wall portion 22D.

The front side outer member 24 includes an upper side flange 24A, an outside sidewall portion 24B, a lower wall portion 24C, and a lower side flange 24D. The front side outer member 24 is configured in substantially an N shape in cross-section, as viewed along the vehicle front-rear direction. The main portion of the front side outer member 24 is configured by the outside sidewall portion 24B, which is disposed with its plate thickness direction in the vehicle width direction. The upper side flange 24A is configured by a further extension toward the vehicle upper side from a peripheral edge portion at the vehicle upper side of the outside sidewall portion 24B. The lower wall portion 24C, which has its plate thickness direction in the vehicle vertical direction, extends out toward the vehicle width direction inner side from a peripheral edge portion at the vehicle lower side of the outside sidewall portion 24B. The lower side flange 24D, which has its plate thickness direction in the vehicle width direction, extends out toward the vehicle lower side from a peripheral edge portion at the vehicle width direction inner side of the lower wall portion 24C.

In the front side inner member 22 and the front side outer member 24 configured as described above, the upper side flange 22A and the upper side flange 24A, and the lower side flange 22E and the lower side flange 24D, are respectively joined at join portions by spot welding or the like. The crash box 18 is disposed at a leading end portion 16C of the front side member 16.

In the crash box 18, a tube shaped collision absorption portion 18A, which has its length direction in the vehicle front-rear direction, and an attachment portion 18B, which is provided extending along the vehicle vertical direction and along the vehicle width direction from a leading end at the vehicle rear side of the collision absorption portion 18A, are integrally formed to each other by an aluminum alloy extrusion material. The attachment portion 18B of the crash box 18 is fixed to the leading end portion 16C of the front side member 16 using fastening members such as bolts.

The bumper reinforcement 20 is disposed at a leading end portion 18C of the crash box 18. The bumper reinforcement 20 is disposed with its length direction in the vehicle width direction and is configured by an aluminum alloy extrusion material configured with a rectangular frame shaped closed cross-section structure in vertical cross-section view. In other words, the bumper reinforcement 20 has a hollow, square pipe shape. Moreover, a vehicle width direction central section of the bumper reinforcement 20 is configured curved in plan view so as to bow toward the vehicle front side. In other words, the bumper reinforcement 20 is formed in a bowed shape bowing toward the vehicle front side. Note that a front bumper cover, not illustrated in the drawings, is disposed at a vehicle front side of the bumper reinforcement 20.

A power unit room 26 is configured between the pair of front side members 16, and a power unit configured including an engine and transmission, not illustrated in the drawings, is disposed inside the power unit room 26. The power unit is attached to each front side member 16 through a power unit mount 28.

In the present exemplary embodiment, the power unit mount 28 is configured including mount brackets 30, 32 serving as power unit support sections. A first feature of the present exemplary embodiment is the configuration of the power unit mount 28, and in particular, the configuration of the mount bracket 32. A second feature of the present exemplary embodiment is the point that a bead section 34 is provided in the vicinity of the location of the front side member 16 where the mount bracket 32 is attached. Detailed explanation follows regarding the configuration of the power unit mount 28 and the bead section 34 that configure relevant portions of the present exemplary embodiment.

First, explanation follows regarding configuration of the power unit mount 28. As illustrated in FIG. 4, the power unit mount 28 is configured including the mount bracket 30 and the mount bracket 32 that are disposed at the vehicle rear side of the mount bracket 30 with a spacing therebetween. A power unit mount main body section, not illustrated in the drawings, is disposed on the mount bracket 30 and the mount bracket 32. The power unit mount main body section is configured including a coupling section configured by a steel member that couples the mount bracket 30 and the mount bracket 32, and a support section that is configured by circular column shaped rubber members onto which the power unit is mounted. The power unit mount main body section is fixed to the mount bracket 30 and the mount bracket 32 using fastening members not illustrated in the drawings such as bolts.

The mount bracket 30 is mainly configured by three pressed steel members, namely, a bracket main body portion 36, a reinforcement section 38, and an inner wall portion 40. The bracket main body portion 36 is configured including an outside wall portion 36A disposed at the vehicle width direction outside, an upper side wall portion 36B extending out from the outside wall portion 36A toward the vehicle width direction inner side, a front side wall portion 36C, and a rear side wall portion 36D. Out of these, the outside wall portion 36A is disposed with its plate thickness direction in the vehicle width direction and is joined to the upper side flange 24A of the front side outer member 24.

The upper side wall portion 36B is configured in a rectangular shape as viewed from the vehicle vertical direction and is disposed with its plate thickness direction in the vehicle vertical direction. The front side wall portion 36C is provided at a peripheral edge portion at the vehicle front side of the upper side wall portion 36B, and the rear side wall portion 36D is provided at a peripheral edge portion at the vehicle rear side of the upper side wall portion 36B. Note that two insertion portions 42 are formed in a central portion of the upper side wall portion 36B with a spacing therebetween in the vehicle width direction, and the power unit mount main body section is attached to the upper side wall portion 36B using the insertion portions 42.

The front side wall portion 36C extends out from a peripheral edge portion at the vehicle front side of the upper side wall portion 36B toward the vehicle lower side, is configured in a rectangular shape as viewed along the vehicle front-rear direction, and is disposed with its plate thickness direction in the vehicle front-rear direction. A portion of the front side wall portion 36C further to the vehicle lower side than the outside wall portion 36A is formed so as to run along the upper wall portion 22B and the inside sidewall portion 22C of the front side inner member 22. The portion of the front side wall portion 36C running along the upper wall portion 22B of the front side inner member 22, as described later, is fixed to the upper wall portion 22B by a flange 36E. Moreover, a peripheral edge portion at the vehicle width direction outside of the front side wall portion 36C running along the inside sidewall portion 22C of the front side inner member 22 is joined, by welding or the like, to the inside sidewall portion 22C at a join portion 44.

The rear side wall portion 36D extends out from a peripheral edge portion at the vehicle rear side of the upper side wall portion 36B toward the vehicle lower side, is configured in a rectangular shape as viewed along the vehicle front-rear direction, and is disposed with its plate thickness direction in the vehicle front-rear direction. The rear side wall portion 36D is configured similarly to the front side wall portion 36C described above, and a portion of the rear side wall portion 36D running along the upper wall portion 22B is fixed to the upper wall portion 22B by a flange 36E. A peripheral edge portion at the vehicle width direction outside of the rear side wall portion 36D running along the inside sidewall portion 22C of the front side inner member 22 is joined, by welding or the like, to the inside sidewall portion 22C at a join portion 46. As viewed along the vehicle width direction, the upper side wall portion 36B, the front side wall portion 36C, and the rear side wall portion 36D of the bracket main body portion 36 configured in this manner form a U shape open to the vehicle lower side. Note that the length of the front side wall portion 36C in the vehicle vertical direction is set the same as the length of the rear side wall portion 36D, or slightly shorter than the length of the rear side wall portion 36D.

The flanges 36E respectively extend out from a portion at the vehicle width direction outside of a peripheral edge portion at the vehicle lower side of the front side wall portion 36C toward the vehicle front side, and from a portion at the vehicle width direction outside of a peripheral edge portion at the vehicle lower side of the rear side wall portion 36D toward the vehicle rear side. The flanges 36E are joined to the upper side wall portion 22B of the front side inner member 22 in a state of face-to-face contact thereto.

The reinforcement section 38 is configured including a reinforcement wall portion, not illustrated in the drawings, which is joined along, and reinforces, the inner peripheral side of portions configured by the upper side wall portion 36B, the front side wall portion 36C, and the rear side wall portion 36D, and flanges 38A provided to respective peripheral edge portions at the vehicle lower side of the reinforcement wall portion. The flanges 38A are joined to the upper wall portion 22B of the front side inner member 22 in a state of face-to-face contact thereto.

As viewed along the vehicle width direction, the inner wall portion 40 is configured in a rectangular plate shape with its length direction in the vehicle vertical direction, and peripheral edge portions excluding the vehicle lower side thereof are joined to inner peripheral sides of the bracket main body portion 36. In a state joined to the bracket main body portion 36, a specific length of the inner wall portion 40 is disposed further to the vehicle upper side than the upper wall portion 22B of the front side inner member 22, and a circular pierced portion 48 is formed in this portion. Note that hereafter, the portion of the inner wall portion 40 positioned further to the vehicle upper side than the upper wall portion 22B of the front side inner member 22 is referred to as the "upper portion 40A". Note that a peripheral edge portion at the vehicle lower side of the inner wall portion 40 is joined to the inside sidewall portion 22C of the front side inner member 22.

Figure 1:
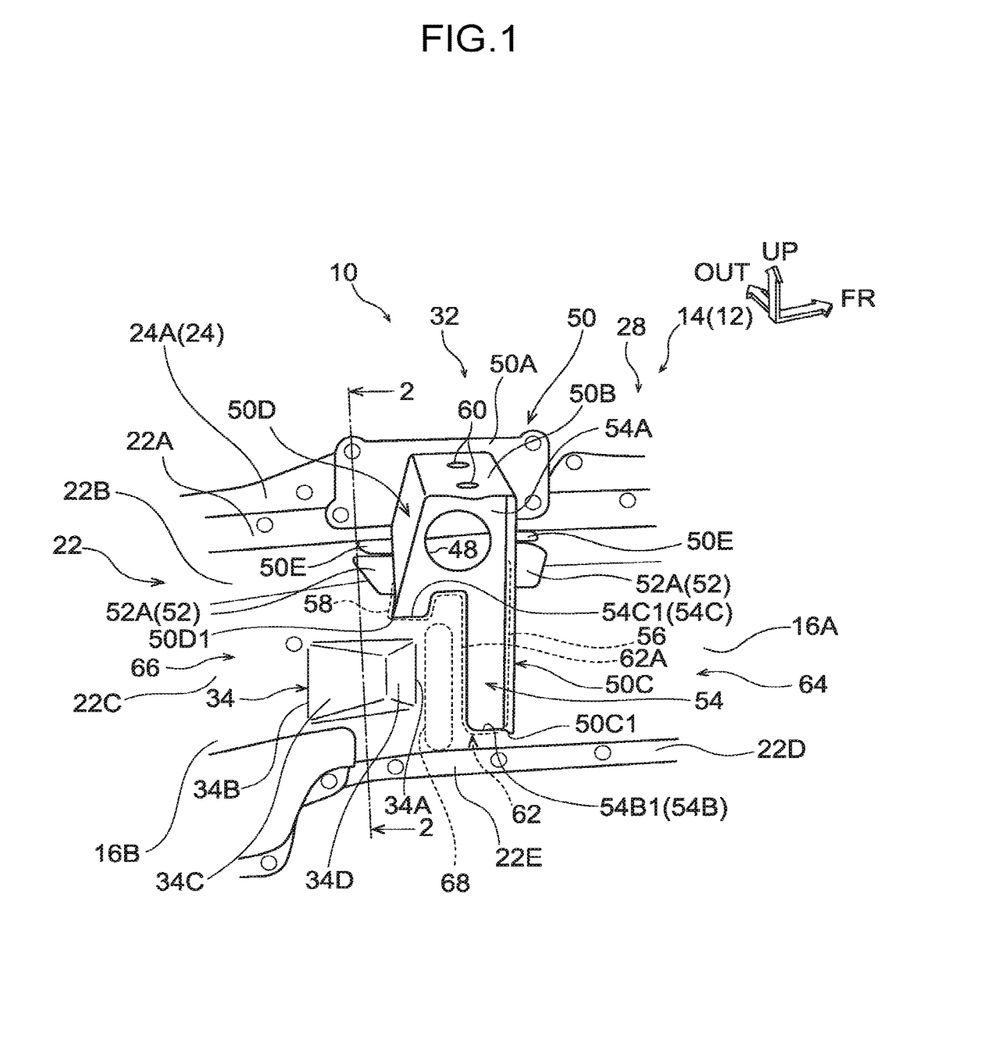
FIG. 1 is an enlarged perspective view of relevant portions of a vehicle front section applied with a vehicle front section structure according to a first exemplary embodiment, as viewed obliquely from a vehicle inside rear.

As illustrated in FIG. 1, the mount bracket 32 is basically configured similarly to the mount bracket 30 described above, and is configured including a bracket main body portion 50, a reinforcement section 52, and an inner wall portion 54 serving as a third wall portion. Similarly to the bracket main body portion 36, the bracket main body portion 50 is configured including an outside wall portion 50A, an upper side wall portion 50B, a front side wall portion 50C serving as a second wall portion, and a rear side wall portion 50D serving as a first wall portion. However, the interrelationships between the lengths of the front side wall portion 50C and the rear side wall portion 50D in the vehicle vertical direction is different to those of the mount bracket 30.

Specifically, in the bracket main body portion 50, the length of the front side wall portion 50C in the vehicle vertical direction is set longer than the length of the rear side wall portion 50D, and an end portion 50C1 at the vehicle lower side of the front side wall portion 50C is disposed further to the vehicle lower side than an end portion 50D1 at the vehicle lower side of the rear side wall portion 50D. Note that the end portion 50C1 of the front side wall portion 50C is disposed in the vicinity of a peripheral edge portion at the vehicle lower side of the inside sidewall portion 22C of the front side inner member 22, and the end portion 50D1 of the rear side wall portion 50D is disposed in the vicinity of a peripheral edge portion at the vehicle upper side of the inside sidewall portion 22C.

A peripheral edge portion at the vehicle width direction outside of the front side wall portion 50C running along the inside sidewall portion 22C of the front side inner member 22 is joined, by welding or the like, to the inside sidewall portion 22C at a join portion 56, serving as a second join portion. A peripheral edge portion at the vehicle width direction outside of the rear side wall portion 50D and running along the inside sidewall portion 22C is joined, by welding or the like, to the inside sidewall portion 22C at a join portion 58, serving as a first join portion. Note that similarly to the bracket main body portion 36, flanges 50E are respectively provided to the front side wall portion 50C and the rear side wall portion 50D, and two insertion portions 60 are formed in the upper side wall portion 50B.

The shape of the flanges 52A of the reinforcement section 52 is different to the shape of the flanges 38A of the reinforcement section 38. Each flange 52A is configured by a trapezoidal shape that narrows from the vehicle width direction outside toward the vehicle width direction inner side. Note that a portion at the vehicle width direction outside of each of the flanges 52A is joined to the upper wall portion 22B of the front side inner member 22 in a state of face-to-face contact thereto. A portion at the vehicle width direction inner side of each flange 52A juts out further to the vehicle width direction inner side than the inside sidewall portion 22C of the front side inner member 22.

The inner wall portion 54 is configured in a plate shape with its plate thickness direction in the vehicle width direction, and a peripheral edge portion excluding the vehicle lower side thereof is joined to an inner peripheral side of the bracket main body portion 50. The inner wall portion 54 is configured including an upper portion 54A disposed further to the vehicle upper side than the upper wall portion 22B of the front side inner member 22, a first extension portion 54B extending out from the upper portion 54A toward the vehicle lower side, and a second extension portion 54C similarly extending out from the upper portion 54A toward the vehicle lower side. The first extension portion 54B is provided to a portion at the vehicle front side of the upper portion 54A. The vehicle front-rear direction width of the first extension portion 54B is approximately one third the vehicle front-rear direction width of the upper portion 54A, and an end portion 54B1 at the vehicle lower side of the first extension portion 54B is aligned with the end portion 50C1 of the front side wall portion 50C. The second extension portion 54C is provided to a portion at the vehicle rear side of the upper portion 54A. The vehicle front-rear direction width of the second extension portion 54C is approximately one third the vehicle front-rear direction width of the upper portion 54A, and an end portion 54C1 at the vehicle lower side of the second extension portion 54C is aligned with the end portion 50D1 of the rear side wall portion 50D. Note that there is a rectangular shaped recess between the first extension portion 54B and the second extension portion 54C protruding inward toward the vehicle upper side.

A peripheral edge portion at the vehicle lower side of the inner wall portion 54 is joined, by welding or the like, to the inside sidewall portion 22C of the front side inner member 22 at a join portion 62. Note that within the join portion 62, a join portion 62A, serving as a third join portion and joining a vehicle vertical direction extending peripheral edge portion configuring a vehicle rear side of the first extension portion 54B, is in a state disposed further to the vehicle front side than the join portion 58 and further to the vehicle rear side than the join portion 56.

Figure 3:
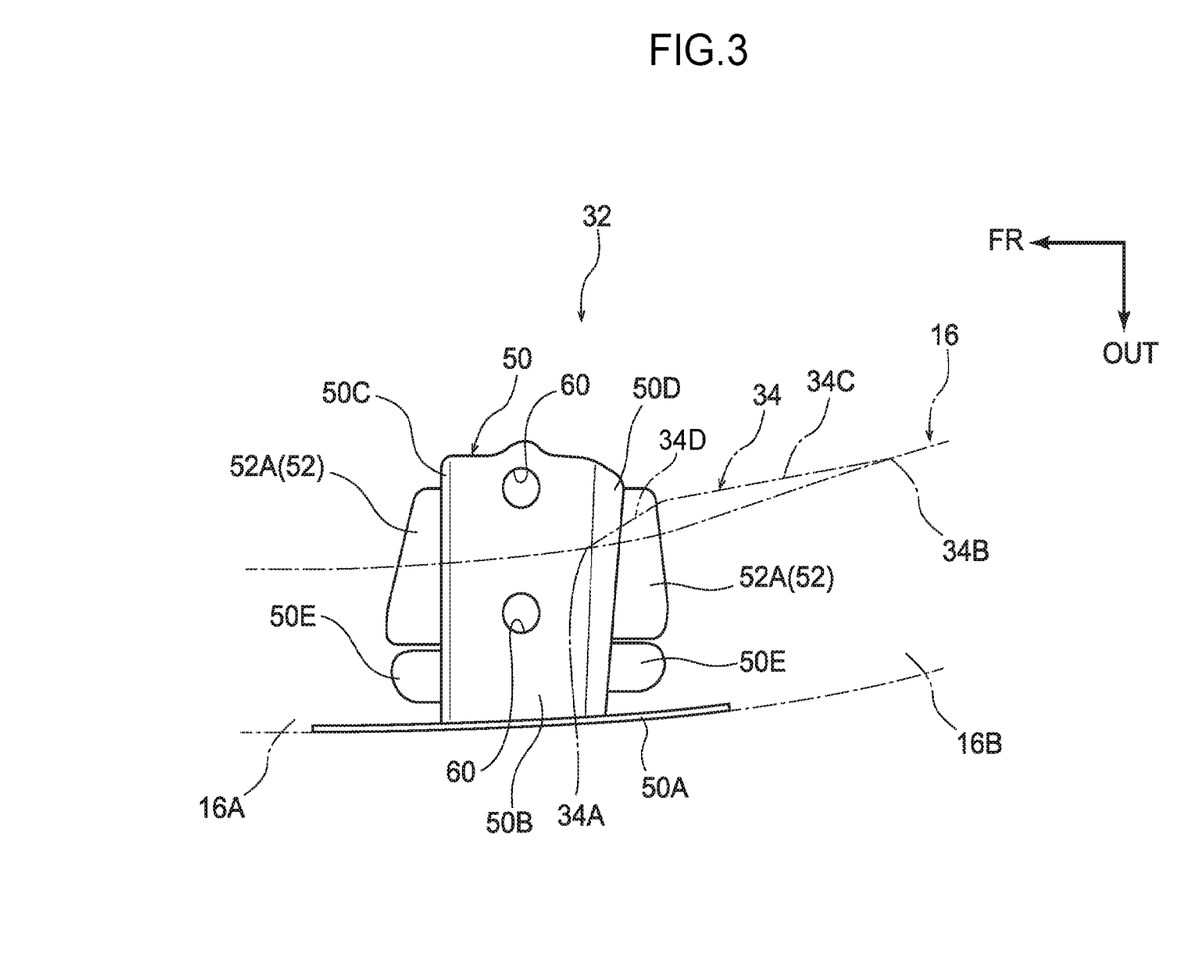
FIG. 3 is a plan view illustrating a relationship between a mount bracket and a bead section formed on a front side member of a vehicle front section applied with a vehicle front section structure of the first exemplary embodiment, as viewed from a vehicle upper side.

As illustrated in FIG. 2 and FIG. 3, the bead section 34 provided to the inside sidewall portion 22C of the front side inner member 22 is integrally formed on the inside sidewall portion 22C and bulges out from the inside sidewall portion 22C toward the vehicle width direction inner side. More specifically, as viewed from the vehicle width direction inner side, the bead section 34 is formed in a quadrilateral shape, and more specifically, is formed in a trapezoidal shape that slightly narrows from the vehicle rear side toward the vehicle front side.

An end portion 34A at the vehicle front side of the bead section 34 extends in the vehicle vertical direction and is disposed further to the vehicle front side and the vehicle lower side than the join portion 58 of the mount bracket 32.

To describe the vehicle front-rear direction position of the end portion 34A of the bead section 34 in more detail, the end portion 34A is disposed along a straight line that bisects the width of the second extension portion 54C of the mount bracket 32 in the vehicle front-rear direction. An end portion 34B at the vehicle rear side of the bead section 34 extends in the vehicle vertical direction and is disposed at a specific interval further toward the vehicle rear side than the join portion 58 of the mount bracket 32. More specifically, the end portion 34B of the bead section 34 is positioned in the vicinity of a boundary portion between the front section 16A and the kick section 16B of the front side member 16.

The bead section 34 is configured including a rear wall portion 34C, serving as one side wall portion configuring the vehicle rear side of the bead section 34, and a front wall portion 34D, serving as another side wall portion configuring the vehicle front side of the bead section 34. In cross-section, as viewed in the vehicle vertical direction, the rear wall portion 34C is inclined from the end portion 34B of the bead section 34 toward the vehicle front side and the vehicle width direction inner side, and the front wall portion 34D is inclined from the end portion 34A of the bead section 34 toward the vehicle rear side and the vehicle width direction inner side. Note that the gradient of the front wall portion 34D is larger than the gradient of the rear wall portion 34C.

Note that in the present exemplary embodiment, as illustrated in FIG. 1, a portion of the inside sidewall portion 22C of the front side member 16 present at the vehicle front side of the join portion 62A is reinforced by the front side wall portion 50C and by the first extension portion 54B of the inner wall portion 54. Note that hereafter, this portion is referred to as a "first high rigidity portion 64". Moreover, a high rigidity portion is configured on the inside sidewall portion 22C within a range where the bead section 34 is formed (this portion is hereafter referred to as a "second high rigidity portion 66"). Accordingly, a low rigidity portion 68, having a relatively lower rigidity than the first high rigidity portion 64 and the second high rigidity portion 66, is configured extending in the vehicle vertical direction at a portion of the inside sidewall portion 22C of the front side member 16 present at the vehicle front side of the bead section 34.

Operation and Advantageous Effects of the Present Exemplary Embodiment

Explanation follows regarding operation and advantageous effects of the present exemplary embodiment.

In the present exemplary embodiment, as illustrated in FIG. 2 and FIG. 4, the front side member 16 extends in the vehicle front-rear direction, and is configured by a closed cross-section structure forming a closed cross-section profile, as viewed along the vehicle front-rear direction. Thus, when collision load is input from the vehicle front side, the front side member 16 undergoes crushing deformation along its length direction, and the collision load is absorbed.

Figure 7A:
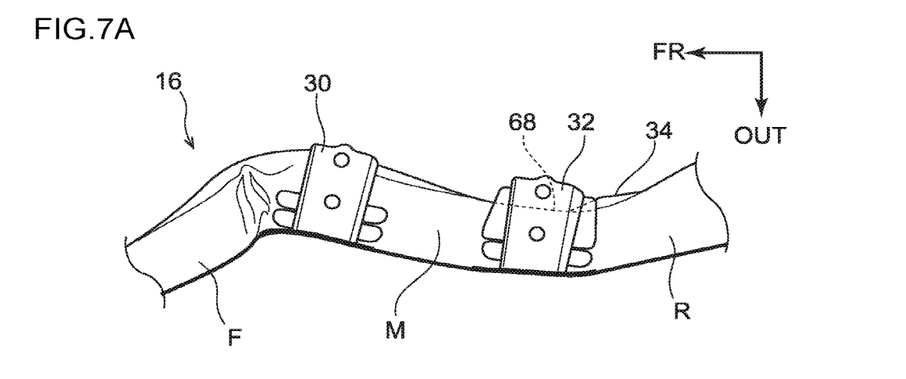
FIG. 7A is a plan view illustrating a state directly after collision load is input in a deformation process of a vehicle body when collision load from the vehicle front side is input to a vehicle front section applied with a vehicle front section structure according to the first exemplary embodiment, as viewed from the vehicle upper side.
Figure 7B:
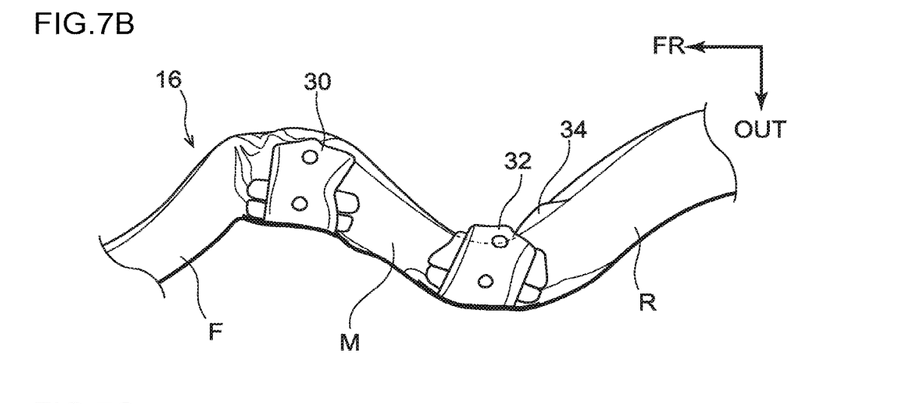
FIG. 7B is a plan view illustrating a state following FIG. 7A in a deformation process of a vehicle body when collision load from the vehicle front side is input to a vehicle front section applied with a vehicle front section structure according to the first exemplary embodiment, as viewed from the vehicle upper side.
Figure 7C:
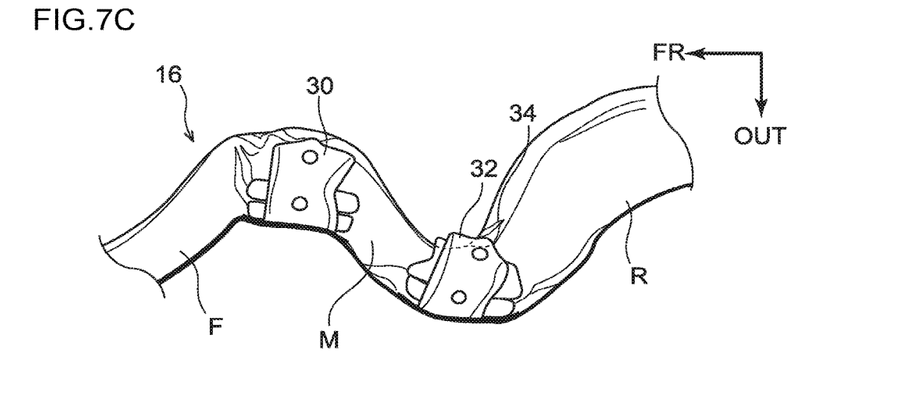
FIG. 7C is a plan view illustrating a state following FIG. 7B in a deformation process of a vehicle body when collision load from the vehicle front side is input to a vehicle front section applied with a vehicle front section structure according to the first exemplary embodiment, as viewed from the vehicle upper side.

More specifically, as illustrated in FIG. 7, upon collision load being input from the vehicle front side of the bumper reinforcement 20, the collision load is also transmitted to the crash box 18. A shock absorbing member 18A of the crash box 18 then undergoes compressive deformation along its axial direction, and the bumper reinforcement 20 that is curved so as to bow toward the vehicle front side undergoes deformation so as to extend in the vehicle width direction. As a result, a portion F at the vehicle front side of the front side member 16 undergoes crushing deformation while being displaced so as to move away in the vehicle width direction.

Moreover, the power unit is attached to the front side member 16 through the mount brackets 30, 32. The mount brackets 30, 32 are configured including the upper side wall portions 36B, 50B supporting the power unit, and the plural wall portions disposed facing the vehicle front-rear direction. The peripheral edge portion at the vehicle width direction outside of the rear side wall portion 50D of the mount bracket 32, this being the wall portion out of the plural wall portions described above disposed furthest to the vehicle rear side, is joined at the join portion 58 to the inside sidewall portion 22C configuring part of the front side member 16. Moreover, the peripheral edge portion at the vehicle width direction outside of the front side wall portion 50C disposed adjacent in the vehicle front-rear direction to the rear side wall portion 50D is joined at the join portion 56 to the inside sidewall portion 22C of the front side member 16. The mount bracket 32 thereby functions as a reinforcement member of the front side member 16, and the rigidity of the portion of the front side member 16 provided with the mount bracket 32 is thereby improved. As a result, the front side member 16 undergoes folding deformation originating from the vicinity of the join portion 58 when collision load is input from the vehicle front side.

To efficiently absorb collision load from the vehicle front side through crushing deformation of the front side member 16, it is effective to stabilize and secure the deformation stroke of the front side member 16. In order to stabilize and secure the deformation stroke of the front side member 16, it is preferable for the axial line of deformation of the front side member 16 to lie along the vehicle vertical direction when the front side member 16 undergoes folding deformation. Moreover, in compact vehicles and the like, sometimes it is preferable for configuration to be made in which the origin point of deformation of the front side member 16 is set at the lower side of the upper side wall portion 50B of the mount bracket 32 in vehicle side view.

Note that in the present exemplary embodiment, the end portion 50C1 at the vehicle lower side of the front side wall portion 50C is disposed further to the vehicle lower side than the end portion 50D1 at the vehicle lower side of the rear side wall portion 50D. Thus, a portion on the inside sidewall portion 22C of the front side member 16 at the periphery of the join portion 56 is reinforced by the front side wall portion 50C, and the rigidity thereof is increased.

The low rigidity portion 68 of the inside sidewall portion 22C of the front side member 16 is disposed further to the vehicle rear side than the join portion 56. The low rigidity portion 68 is disposed at the vehicle front side of and at the vehicle lower side of the join portion 58. The rigidity of the low rigidity portion 68 is set lower than that of a portion on the inside sidewall portion 22C of the front side member 16 further to the vehicle rear side than the join portion 58, and the low rigidity portion 68 extends in the vehicle vertical direction. Thus, when collision load is input from the vehicle front side, the front side member 16 undergoes deformation originating at the low rigidity portion 68, and the axial line of deformation of the front side member 16 when undergoing folding deformation lies along the vehicle vertical direction. Moreover, the low rigidity portion 68 is in a state disposed at the lower side of the upper side wall portion 50B of the mount bracket 32 in vehicle side view. The origin point of deformation of the front side member 16 is thereby set at the lower side of the upper side wall portion 50B of the mount bracket 32 in vehicle side view.

Figure 6A:
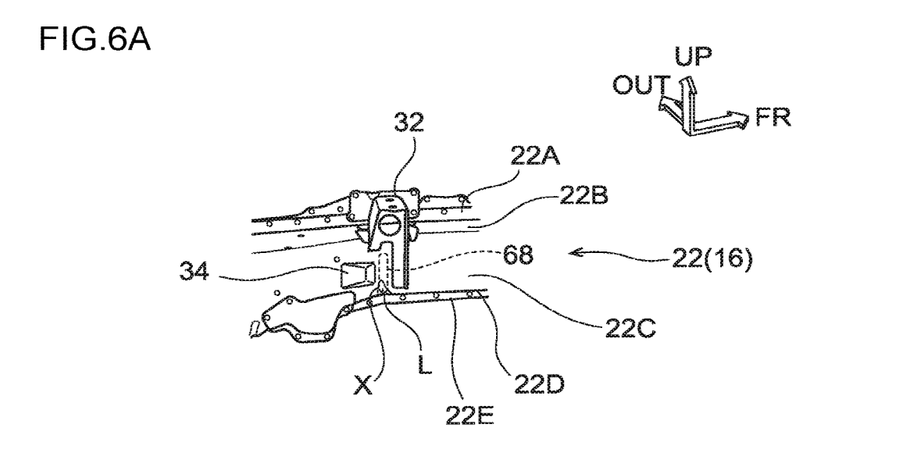
FIG. 6A is a perspective view illustrating a state directly after collision load is input in a deformation process of a vehicle body when collision load from the vehicle front side is input to a vehicle front section applied with a vehicle front section structure according to the first exemplary embodiment, as viewed obliquely from the vehicle inside rear.
Figure 6B:
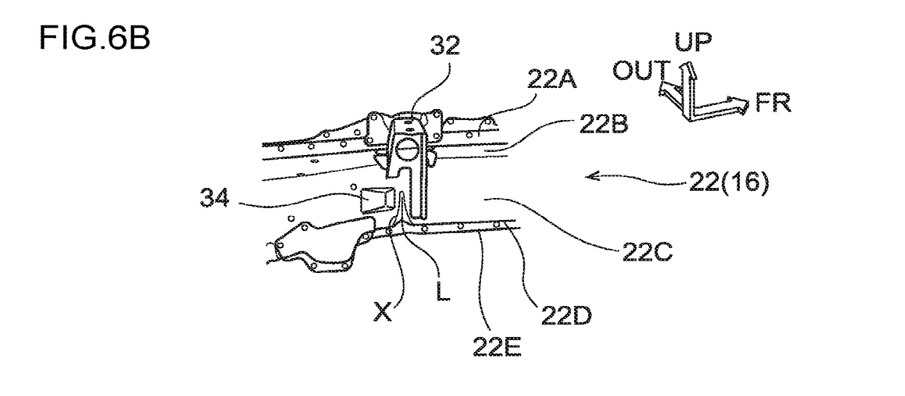
FIG. 6B is a perspective view illustrating a state following FIG. 6A in a deformation process of a vehicle body when collision load from the vehicle front side is input to a vehicle front section applied with a vehicle front section structure according to the first exemplary embodiment, as viewed obliquely from the vehicle inside rear.

Specifically, as illustrated in FIG. 6A, when collision load is input from the vehicle front side, the front side member 16 undergoes deformation originating at a portion at the vehicle lower side of the low rigidity portion 68, namely, at a portion in the low rigidity portion 68 at the boundary between the inside sidewall portion 22C and the lower wall portion 22D. In other words, at an initial stage when collision load is input from the vehicle front side, a plastic deformation portion X and a fold line L extending in the vehicle vertical direction develop in the low rigidity portion 68 at the boundary portion between the inside sidewall portion 22C and the lower wall portion 22D. As this deformation progresses further, as illustrated in FIG. 6B, the plastic deformation portion X and the fold line L extend toward the vehicle upper side. Ultimately, as illustrated in FIG. 6C, the plastic deformation portion X and the fold line L reach the boundary portion between the inside sidewall portion 22C and the upper wall portion 22B.

Figure 6C:
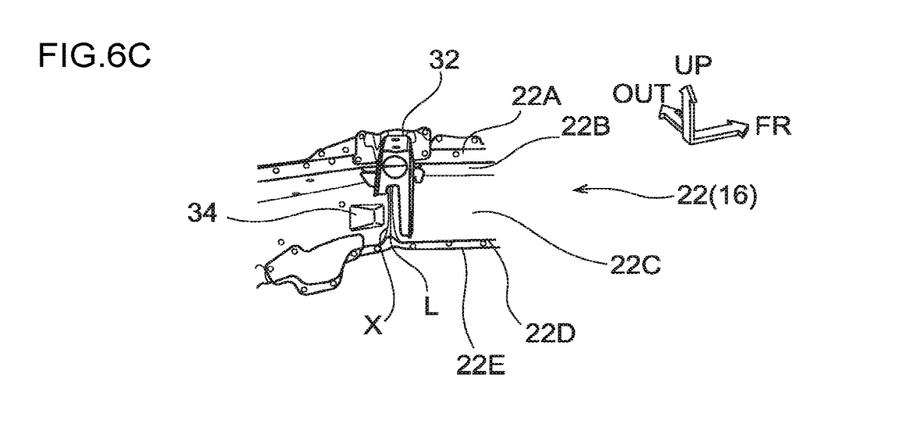
FIG. 6C is a perspective view illustrating a state following FIG. 6B in a deformation process of a vehicle body when collision load from the vehicle front side is input to a vehicle front section applied with a vehicle front section structure according to the first exemplary embodiment, as viewed obliquely from the vehicle inside rear.

FIG. 7A, FIG. 7B, and FIG. 7C respectively correspond to the states in FIG. 6A, FIG. 6B, and FIG. 6C. As illustrated in FIG. 7A, when collision load is input from the vehicle front side, a portion M of the front side member 16 between the mount bracket 30 and the mount bracket 32 undergoes deformation so as to pivot about the low rigidity portion 68 toward the vehicle width direction inner side. As illustrated in FIG. 7B, the portion M continues to pivot further toward the vehicle width direction inner side as deformation of the front side member 16 progresses; however, the length of the front side member 16 is substantially maintained. Ultimately, as illustrated in FIG. 7C, a portion R of the front side member 16 further to the vehicle rear side than the portion M undergoes crushing deformation along its length direction, while pivoting about the vehicle rear side toward the vehicle width direction outside. Crushing deformation also progresses along the length direction of the portion F described above at the vehicle front side of the front side member 16. Accordingly, in the present exemplary embodiment, when collision load is input from the vehicle front side, the deformation stroke of the front side member 16 can be stabilized and secured, and, in vehicle side view, the origin point of deformation of the front side member 16 can be set at the lower side of the wall portion supporting the power unit.

In the present exemplary embodiment, the bead section 34 that bulges out toward the vehicle width direction inner side is integrally formed on the inside sidewall portion 22C of the front side member 16. The end portion 34A at the vehicle front side of the bead section 34 is disposed at the vehicle front side and the vehicle lower side of the join portion 58. The second high rigidity portion 66 is thereby configured within a range of the inside sidewall portion 22C of the front side member 16 where the bead section 34 is formed, from the end portion 34A of the bead section 34 toward the vehicle rear side thereof.

Moreover, the end portion 34A at the vehicle front side of the bead section 34 extends along the vehicle vertical direction. The low rigidity portion 68, which extends in the vehicle vertical direction and has relatively lower rigidity than the second high rigidity portion 66 configured including the bead section 34, is accordingly configured at a portion of the inside sidewall portion 22C of the front side member 16 between the end portion 34A of the bead section 34 and the join portion 56. Namely, in the present exemplary embodiment, the second high rigidity portion 66 can be set to the front side member 16 without providing a separate member, and the low rigidity portion 68 that becomes the origin point of folding deformation when the front side member 16 undergoes folding deformation can be set without lowering the rigidity of the front side member 16. Accordingly, in the present exemplary embodiment, the deformation stroke of the front side member 16 can be stabilized and secured while both suppressing an increased load on the front side member 16 and maintaining the rigidity of the front side member 16.

Moreover, in the present exemplary embodiment, the end portion 34B at the vehicle rear side of the bead section 34 is disposed at a specific interval further toward the vehicle rear side than the join portion 58. The second high rigidity portion 66 is thereby configured at the inside sidewall portion 22C of the front side member 16 as far as a range further to the vehicle rear side than the join portion 58 using the bead section 34.

The front side member 16 is accordingly reinforced not only by the bead section 34 but also by the mount bracket 32. In a case in which the end portion 34B at the vehicle rear side of the bead section 34 is disposed in the vicinity of the join portion 58 in the vehicle front-rear direction, the rigidity would change greatly between the vehicle rear side and the vehicle front side of the join portion 58. As a result, when collision load is input from the vehicle front side, it is conceivable that the join portion 58 would become the origin point of folding deformation of the front side member 16, decreasing the degree of certainty that the origin point of deformation is at the lower side of the upper side wall portion 50B of the mount bracket 32 in vehicle side view.

In the present exemplary embodiment, the inside sidewall portion 22C of the front side member 16 is reinforced by the bead section 34 over the range further to the vehicle rear side than the join portion 58, thereby enabling the rigidity of the front side member 16 to be suppressed from changing greatly in the vicinity of the join portion 58. Thus in the present exemplary embodiment, when collision load is input from the vehicle front side, the degree of certainty can be increased that the origin point of folding deformation of the front side member 16 is at the lower side of the upper side wall portion 50B of the mount bracket 32 in vehicle side view.

Additionally, in the present exemplary embodiment, the bead section 34 formed on the front side member 16 is configured including the rear wall portion 34C configuring the vehicle rear side of the bead section 34, and the front wall portion 34D configuring the vehicle front side of the bead section 34. The rear wall portion 34C is inclined from the end portion 34B at the vehicle rear side of the bead section 34 toward the vehicle front side and the vehicle width direction inner side, in cross-section as viewed along the vehicle vertical direction. In contrast, the front wall portion 34D is inclined from the end portion 34A at the vehicle front side of the bead section 34 toward the vehicle rear side and the vehicle width direction inner side, in cross-section as viewed along the vehicle vertical direction, and the gradient of the front wall portion 34D is larger than the gradient of the rear wall portion 34C.

Taking the end portion 34A at the vehicle front side of the bead section 34 as a reference, the rigidity of the portion of the inside sidewall portion 22C of the front side member 16 where the bead section 34 is provided gradually increases from the end portion 34A toward the boundary portion between the front wall portion 34D and the rear wall portion 34C. The rigidity of the portion of the inside sidewall portion 22C from the boundary portion between the front wall portion 34D and the rear wall portion 34C of the bead section 34 to the end portion 34B at the vehicle rear side of the bead section 34 gradually lowers from the boundary portion toward the end portion 34B. The amount of change in the rigidity per unit length in the vehicle front-rear direction of the portion of the inside sidewall portion 22C where the bead section 34 is provided is greater at the front wall portion 34D side than at the rear wall portion 34C side. As a result, when collision load is input from the vehicle front side, stress more readily concentrates at the location of the inside sidewall portion 22C where the end portion 34A of the bead section 34 is disposed. In contrast, when collision load is input from the vehicle front side, stress is suppressed from concentrating at the location of the inside sidewall portion 22C where the end portion 34B of the bead section 34 is disposed, compared to the location where the end portion 34A of the bead section 34 is disposed. Thus in the present exemplary embodiment, when collision load is input from the vehicle front side, the degree of certainty is increased that the front side member 16 undergoes deformation originating at the low rigidity portion 68.

Second Exemplary Embodiment

Figure 8:
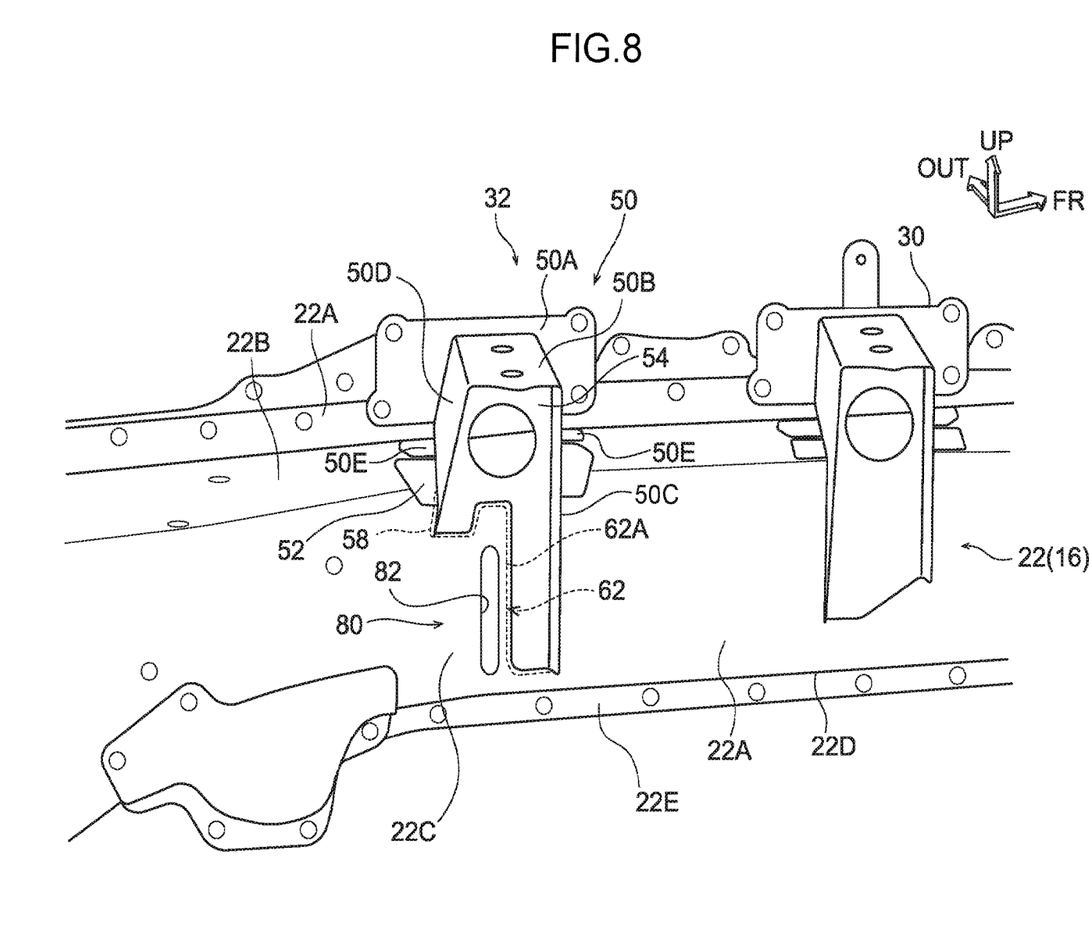
FIG. 8 is a perspective view of a vehicle front section applied with a vehicle front section structure according to a second exemplary embodiment, as viewed obliquely from the vehicle inside rear.

Explanation follows regarding a vehicle front section structure according to a second exemplary embodiment of the present invention, with reference to FIG. 8. Note that portions configured the same as those of the first exemplary embodiment described above are appended with the same reference numerals, and explanation thereof is omitted.

A feature of the present exemplary embodiment is the point that a low rigidity portion 80 is configured by a pierced portion 82. Specifically, the pierced portion 82 is formed piercing through the inside sidewall portion 22C of the front side inner member 22 in the vehicle width direction and extending along the vehicle vertical direction and configured in a rectangular shape having both length direction end portions configured in circular arc shapes. The pierced portion 82 is disposed further to the vehicle rear side than the join portion 62A of the inside sidewall portion 22C, and is disposed at the vehicle front side and the vehicle lower side of the join portion 58.

Thus when collision load is input from the vehicle front side, the front side member 16 undergoes deformation originating at the pierced portion 82, and the axial line of deformation of the front side member 16 when undergoing folding deformation lies along the vehicle vertical direction. In vehicle side view, the pierced portion 82 is in a state disposed at the lower side of the upper side wall portion 50B of the mount bracket 32, and the origin point of deformation of the front side member 16 is set at the lower side of the upper side wall portion 50B of the mount bracket 32 in vehicle side view. Aside from the operation and advantageous effects due to the bead section 34, the present exemplary embodiment accordingly exhibits the same operation and advantageous effects as those of the first exemplary embodiment described above.

In the present exemplary embodiment, the pierced portion 82 is formed piercing through the inside sidewall portion 22C of the front side member 16 in the vehicle width direction, and the low rigidity portion 80 is configured by the pierced portion 82. The low rigidity portion 80 can thereby be set to any position within a specific range of the inside sidewall portion 22C (between the join portion 58 and the join portion 62A in the vehicle front-rear direction). The rigidity of the portion of the inside sidewall portion 22C that is configured by the low rigidity portion 80 can be adjusted by adjusting the length and width of the pierced portion 82. Thus in the present exemplary embodiment, the origin point of folding deformation in the front side member 16 when collision load is input from the vehicle front side can be set by performing simple processing on the front side member 16.

Supplementary Explanation of the Above Exemplary Embodiments (1) In the first exemplary embodiment described above, the bead section 34 is integrally provided to the front side member 16; however, the bead section 34 may be configured as a separate body. For example, configuration may be made in which a bracket with the same shape as that of the bead section 34 is joined to the inside sidewall portion 22C of the front side member 16, or a rectangular shaped plate is joined to the inside sidewall portion 22C. The shape of the bead section 34 is also is not limited to the configurations described above, and a various configurations may be adopted, such as rectangular shapes or the like extending in the vehicle vertical direction, as viewed along the vehicle width direction.

(2) Moreover, in the exemplary embodiments described above, the mount brackets 30, 32 are configured as separate bodies; however, configuration may be adopted in which these mount brackets are integrated together to configure a power unit support section.

(3) In the exemplary embodiments described above, configuration is adopted in which the vehicle rear side of the power unit mount 28 is configured by the mount bracket 32 and the low rigidity portion is disposed at the vehicle rear side of the mount bracket 32; however, there is no limitation thereto. For example, the vehicle front side of the power unit mount 28 may be configured by a bracket of symmetrical configuration in the vehicle front-rear direction to the mount bracket 32, with the low rigidity portion disposed at the vehicle front side of this bracket.

(4) Additionally, in the exemplary embodiments described above, the mount brackets 30, 32 are configured by plural members; however, the mount brackets 30, 32 may be integrally configured by pressing. As an example, configuration may be adopted in which the mount bracket 32 is configured with the bracket main body portion 50 and the inner wall portion 54 integrated together, formed by pressing from a single sheet of steel. Moreover, the mount bracket 30 may be configured by the bracket main body portion 36 alone, and the mount bracket 32 may be configured by the bracket main body portion 50 alone.

(5) Furthermore, in the exemplary embodiments described above, the low rigidity portion is set to each of the front side members 16 present at the two vehicle width direction sides. However, configuration may be adopted in which the low rigidity portion is set to the front side member 16 at only one of the vehicle width direction sides, according to the vehicle model and the driving environment.

What is claimed is:

1. A vehicle front section structure, comprising:
a front side member that extends in a vehicle front-rear direction, that includes an inside sidewall portion disposed at a vehicle width direction inner side, and that is configured by a closed cross-section structure forming a closed cross-section profile as viewed in the vehicle front-rear direction;
a first wall portion that configures a first part of a power unit support section attaching a power unit to the front side member, that is disposed furthest toward one side in the vehicle front-rear direction among a plurality of wall portions disposed facing the vehicle front-rear direction, and that has a peripheral edge portion at a vehicle width direction outer side joined to the inside sidewall portion by a first join portion;
a second wall portion that configures a second part of the power unit support section, that is disposed adjacent to the first wall portion in the vehicle front-rear direction, that has an end portion at a vehicle lower side disposed further toward the vehicle lower side than an end portion at the vehicle lower side of the first wall portion, and that has a peripheral edge portion at the vehicle width direction outer side joined to the inside sidewall portion by a second join portion;
a low rigidity portion of the inside sidewall portion that is disposed at another side in the vehicle front-rear direction, and the vehicle lower side, of the first join portion, that is disposed further toward the one side in the vehicle front-rear direction than the second join portion, that has a lower rigidity than a portion of the inside sidewall portion further toward the one side in the vehicle front-rear direction than the first join portion, and that extends in the vehicle vertical direction; and
a bead section that is integrally formed at the inside sidewall portion and that bulges toward the vehicle width direction inner side, an end portion at the another side in the vehicle front-rear direction of the bead section extending along the vehicle vertical direction and being disposed at the another side in the vehicle front-rear direction, and the vehicle lower side, of the first join portion,
wherein the low rigidity portion is provided at a portion of the inside sidewall portion between the second join portion and the end portion at the another side in the vehicle front-rear direction of the bead section.

2. The vehicle front section structure of claim 1, wherein an end portion at the one side in the vehicle front-rear direction of the bead section is disposed at a specific interval further toward the one side in the vehicle front-rear direction than the first join portion.

3. The vehicle front section structure of claim 2, wherein:
the bead section includes one side wall portion configuring the one side in the vehicle front-rear direction of the bead section, and another side wall portion configuring the another side in the vehicle front-rear direction of the bead section; and
in cross-section, as viewed in the vehicle vertical direction, the one side wall portion is inclined from the end portion at the one side in the vehicle front-rear direction of the bead section toward the another side in the vehicle front-rear direction and toward the vehicle width direction inner side, the another side wall portion is inclined from the end portion at the another side in the vehicle front-rear direction of the bead section toward the one side in the vehicle front-rear direction and toward the vehicle width direction inner side, and a gradient of the another side wall portion is larger than a gradient of the one side wall portion.

* * * * *